US009260649B2

(12) United States Patent
Titley

(10) Patent No.: US 9,260,649 B2
(45) Date of Patent: Feb. 16, 2016

(54) METHOD AND SYSTEM FOR REDUCING OXIDATION OF GLYCOL IN FLUID HANDLING SYSTEMS

(71) Applicant: Andrew Mark Titley, Rossmoyne (AU)

(72) Inventor: Andrew Mark Titley, Rossmoyne (AU)

(73) Assignee: Chevron U.S.A. Inc., San Ramon, CA (US)

( * ) Notice: Subject to any disclaimer, the term of this patent is extended or adjusted under 35 U.S.C. 154(b) by 87 days.

(21) Appl. No.: 14/334,833

(22) Filed: Jul. 18, 2014

(65) Prior Publication Data

US 2016/0017205 A1    Jan. 21, 2016

(51) Int. Cl.
*C09K 8/52* (2006.01)
*F16L 58/00* (2006.01)

(52) U.S. Cl.
CPC . *C09K 8/52* (2013.01); *F16L 58/00* (2013.01); *C09K 2208/22* (2013.01)

(58) Field of Classification Search
None
See application file for complete search history.

(56) References Cited

U.S. PATENT DOCUMENTS

| 9,090,813 | B2* | 7/2015 | Kaasa | C09K 8/52 |
| 2009/0221451 | A1* | 9/2009 | Talley | C09K 8/52 507/90 |
| 2011/0319682 | A1* | 12/2011 | Kang | C07D 207/06 585/3 |
| 2012/0018293 | A1* | 1/2012 | Kaasa | C09K 8/52 203/18 |
| 2013/0112923 | A1* | 5/2013 | Kang | C10L 3/107 252/400.41 |

* cited by examiner

*Primary Examiner* — John J Figueroa
(74) *Attorney, Agent, or Firm* — Karen R. DiDomenicis

(57) ABSTRACT

Disclosed are methods and systems for reducing the risk of oxidation of hydrate inhibitors such as monoethylene glycol used to prevent the formation of hydrates in fluid handling systems including flow lines and pipelines. A hydrate inhibitor storage tank in fluid communication with the fluid handling system is used to hold a volume of liquid hydrate inhibitor and a volume of high purity argon as a blanket gas.

12 Claims, 3 Drawing Sheets

METHOD AND SYSTEM FOR REDUCING OXIDATION OF GLYCOL IN FLUID HANDLING SYSTEMS

FIELD

The present disclosure relates to methods and systems for inhibiting the formation of natural gas hydrates in fluid handling systems that convey natural gas.

BACKGROUND

Glycols and methanol are commonly used to inhibit the formation of natural gas clathrate hydrates in pipelines and flow lines in fluid handling systems which convey fluids containing natural gas from oil and gas production sites to oil and gas processing facilities. Glycol is also known as monoethylene glycol, MEG, ethylene glycol, ethylene alcohol, ethane-1,2-diol, and 1,2-ethanediol. Such hydrates are formed from hydrocarbon gases such as methane in the presence of free water at high pressures and low temperatures. Hydrates can accumulate to block pipelines and flow lines, thus impeding production.

In many circumstances, glycol is preferred as a hydrate inhibitor over methanol as glycol has lower flammability risk and is easy to recover and reuse. However, the recovery of glycol introduces potential for exposure to air and specifically to oxygen. Oxygen contamination in glycol systems increases corrosion risk in pipelines, flow lines and other exposed equipment. These risks increase as glycols oxidize and decompose to form organic acids, particularly at higher temperatures. The presence of oxygen can interfere with corrosion inhibitors, exacerbate corrosion rates of iron and many other metals by methods including carbon dioxide and hydrogen sulfide corrosion mechanisms, and encourage aerobic bacteria to grow which can further promote pitting of equipment.

One known method for managing these risks is to use nitrogen or a blanket of dry hydrocarbon gas to exclude oxygen from glycol storage tanks, sumps and other sources of oxygen ingress. The use of nitrogen as a blanket gas has not been effective to eliminate oxygen, as low-grade nitrogen can have an oxygen content of between 3 and 5 vol %. Even high purity nitrogen produced by the cryogenic distillation of air can have an oxygen content of up to 10 ppm. The use of a hydrocarbon blanket gas can be more effective at eliminating oxygen, but introduces flammability and explosion risks.

Another known method for managing these risks is to use chemicals such as oxygen scavengers and oxidation inhibitors. However, such methods have been developed based on pure water systems which raise concerns regarding efficacy in the presence of glycol due to reaction kinetics.

It would be desirable to maintain an oxygen content in the process stream of less than 20 ppb to avoid problems with corrosion, pitting, cracking and the like. Such a low level has been difficult to achieve, monitor and enforce.

SUMMARY

In one aspect, a method is provided for reducing the risk of oxidation of glycol in fluid handling systems using glycol as a hydrate inhibitor. The method includes providing a tank in fluid communication with the fluid handling system for storing a volume of hydrate inhibitor containing glycol; and providing a layer of blanket gas containing argon in direct contact with the volume of hydrate inhibitor in the tank.

In another aspect, a system is provided which includes a tank in fluid communication with a fluid handling system for storing a volume of hydrate inhibitor containing glycol; and a layer of blanket gas containing argon in direct contact with the volume of hydrate inhibitor in the tank.

DESCRIPTION OF THE DRAWINGS

These and other objects, features and advantages of the present invention will become better understood with reference to the following description, appended claims and accompanying drawings where:

DETAILED DESCRIPTION

Figure 1:
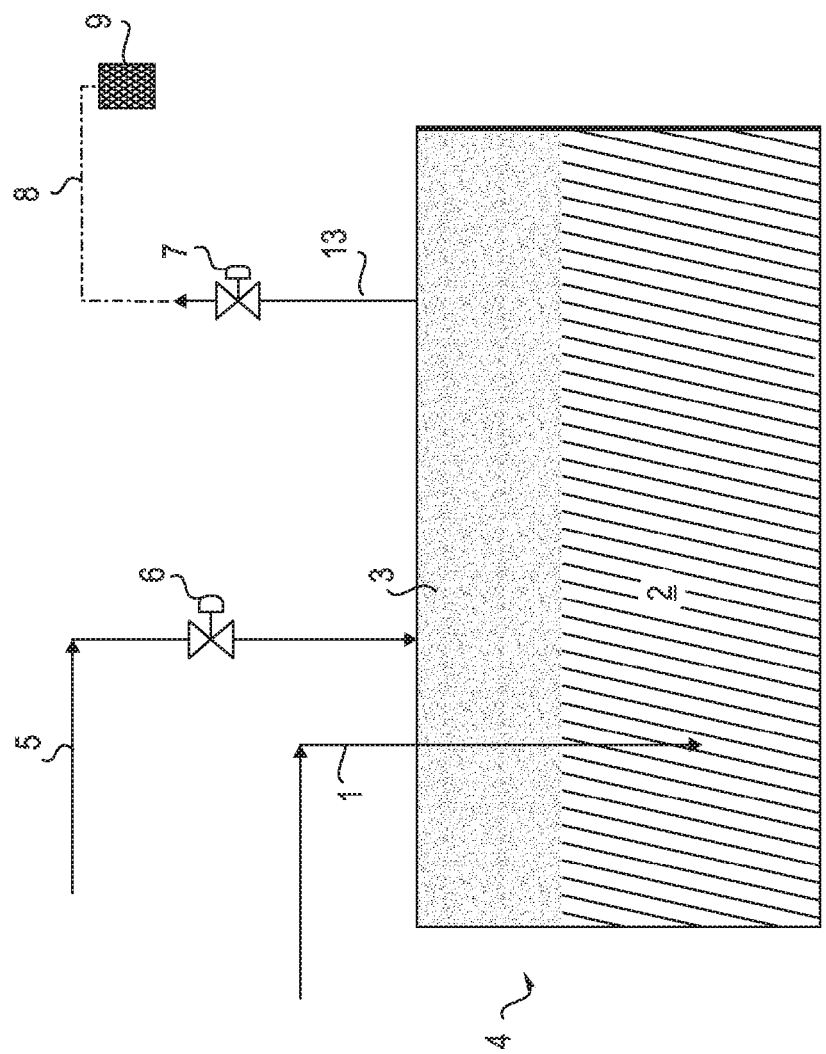
FIG. 1 is a simplified view of a prior art system.

FIG. 1 is a simplified view of a prior art system in which glycol 2, also referred to interchangeably as hydrate inhibitor, monoethylene glycol, MEG, aqueous solution or aqueous glycol solution, is stored as a volume of liquid in a tank 4. The tank 4 operates at atmospheric pressure. The MEG 2 can be fed into the tank 4 from a source of hydrate inhibitor (not shown) through hydrate inhibitor conduit 1. The MEG 2 can be stored at atmospheric pressure. Above the volume of MEG 2, an upper space in the tank 4 contains a volume of blanket gas 3. Blanket gas 3 can be fed into the tank 4 from a source of the blanket gas (not shown) through a blanket gas inlet conduit 5. The tank 4 allows blanket gas 3 to pass in and out of the tank 4 in order to prevent failure of the tank 4 due to either overpressure or vacuum as the liquid level changes. As MEG 2 enters and leaves the tank 4, the level of MEG 2 rises and falls. As the MEG level rises, valve 7 opens to allow the blanket gas 3 to leave the tank 4. Upon leaving the tank 4, the blanket gas 3 is directed to a vent 8 and a flame arrestor 9. A blanket gas inlet valve 6 in the blanket gas inlet conduit 5 can be provided to control the introduction or flow of blanket gas 3 into the tank 4 as the volume of hydrate inhibitor in the tank decreases. A blanket gas outlet valve 7 in the blanket gas outlet conduit 13 can control the exit flow of blanket gas 3 from the tank 4 as the volume of hydrate inhibitor 2 in the tank 4 increases. A blanket gas outlet conduit 13 can connect the blanket gas 3 in the tank 4 with a vent 8 and a flame arrestor 9. The vent 8 routes the blanket gas 3 to a safe location. The flame arrestor 9 is provided to prevent ignition of the blanket gas 3.

In one embodiment, a volume of liquid hydrate inhibitor is stored in a tank in fluid communication with a fluid handling system which conveys fluids containing natural gas from oil and gas production sites to gas processing facilities. The concentration of the glycol solution used depends on particular operating conditions, particularly ambient seabed temperature. Glycol solution at too high a concentration will become very viscous at low temperature and thus too difficult to pump. In one embodiment, the hydrate inhibitor is an aqueous solution containing from 15 to 95 vol % glycol. The MEG used for hydrate inhibition is typically referred to as "lean MEG" and typically contains from 70 to 90 wt % glycol to meet viscosity and freezing point limits. The returning MEG is referred to as "rich MEG" and due to uncertainties in predicting water content, e.g., injection when no or little water is actually present, such as during start-up, the concentration can vary significantly. In one embodiment, the hydrate inhibitor is a returning MEG having been used for hydrate inhibition containing from 15 to 95 vol % glycol, even from 15 to 20 vol % glycol.

Figure 2:
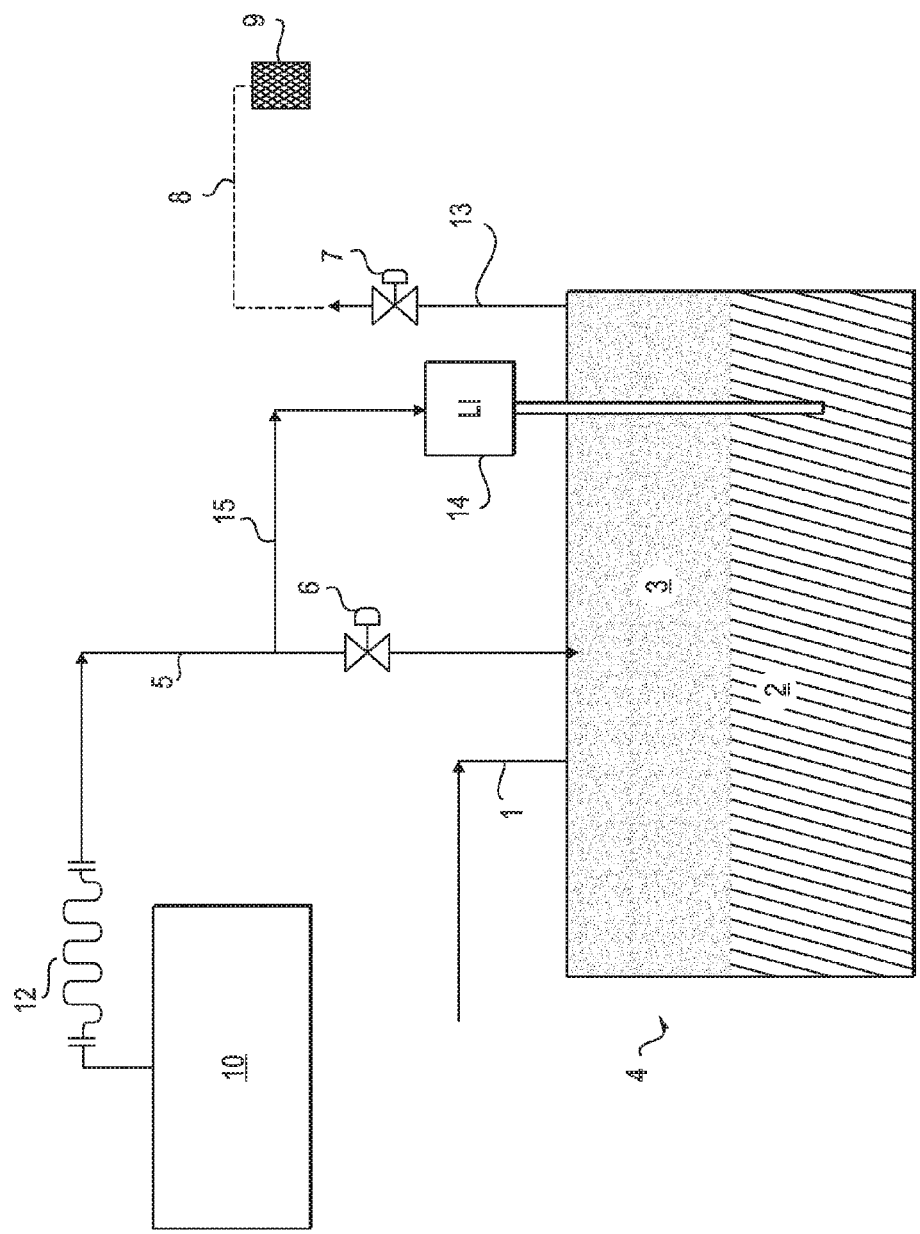
FIG. 2 is a simplified view of a system according to one exemplary embodiment.

As illustrated in FIG. 2, in one embodiment, above and in direct contact with the volume of MEG 2, the tank 4 contains a volume of blanket gas 3. In one embodiment, blanket gas 3 contains high purity argon, even at least 99.995 mol % argon. High purity argon can be advantageously easier to produce than high purity nitrogen, as nitrogen is difficult to separate from oxygen. In one embodiment, the blanket gas 3 contains less than 1 ppm oxygen. In one embodiment, the blanket gas 3 can be fed into the tank 4 from a source of the blanket gas 10 through a blanket gas inlet conduit 5. The source of the blanket gas 10 can be either a tank of argon or a local cryogenic distillation unit. Optionally, a section of flexible hose 12 can be provided along the blanket gas inlet conduit through which to see the blanket gas 3. The use of the flexible hose 12 advantageously obviates the need for precise positioning of the blanket gas tank 10 with respect to the storage tank 4. The tank 4 allows blanket gas 3 to pass in and out of the tank 4 in order to prevent failure of the tank 4 due to either overpressure or vacuum as the liquid level changes.

In one embodiment, the level of the glycol 2 in the tank 4 is measured by a level detector 14 also referred to as a level indicator LI. The level detector 14 can utilize at least one of radar, nucleonic, bubbler and float technologies. In one embodiment, the blanket gas 3 can be supplied to the tank 4 through conduit 15 and through level indicator 14 utilizing bubbler technology. The bubbler then serves both as a level detector 14 of the glycol 2 within the tank 4 and as a way to feed blanket gas 3 into the tank 4.

Figure 3:
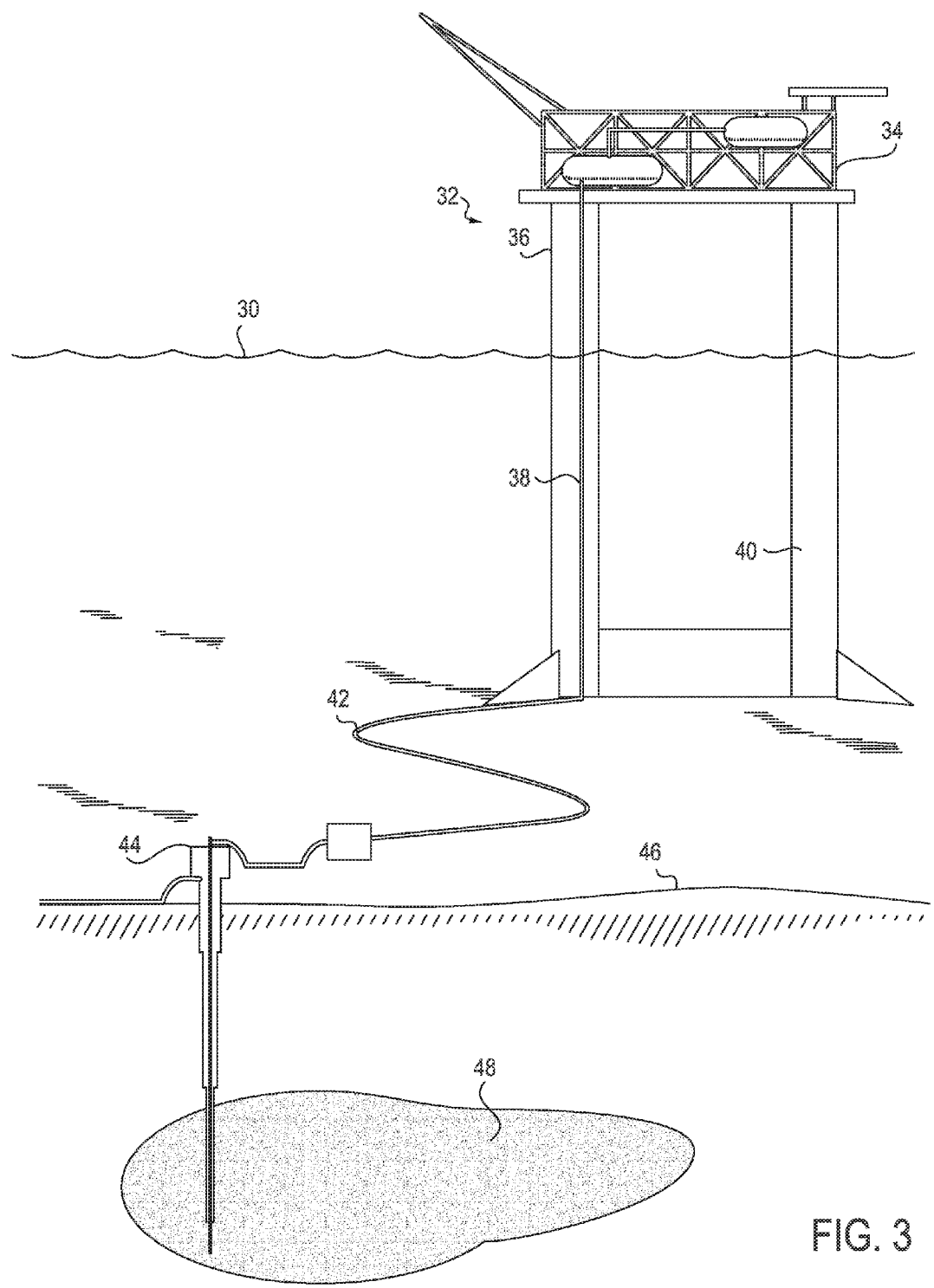
FIG. 3 is a simplified view of a system according to one exemplary embodiment.

In one embodiment, the tank can be located within the structure or legs of an offshore platform associated with offshore oil and gas production. In the system illustrated in FIG. 3, in one embodiment, an offshore platform 32 includes a topsides structure 34 and a substructure 40, also referred to herein as structure or legs 40, partially submerged beneath sea level 30. At least a portion of the structure or legs 40 may be used as the MEG tank 36. The system further includes at least a riser 38, a flowline 42 for injection of hydrate inhibitor, a wellhead 44 and a reservoir 48 beneath the earth's surface 46.

It should be noted that only the components relevant to the disclosure are shown in the figures, and that many other components normally part of a glycol unit are not shown for simplicity.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for reducing risk of oxidation of glycol in fluid handling systems using glycol as a hydrate inhibitor, comprising:
    a. providing a tank in fluid communication with the fluid handling system for storing a volume of hydrate inhibitor comprising glycol; and
    b. providing a layer of blanket gas comprising argon in direct contact with the volume of hydrate inhibitor in the tank.

2. The method of claim 1, wherein the hydrate inhibitor comprises an aqueous solution comprising 15 to 90 vol % glycol.

3. The method of claim 1, wherein the hydrate inhibitor comprises a returned aqueous solution having been used for hydrate inhibition comprising an aqueous solution comprising 15 to 90 vol % glycol.

4. The method of claim 1, wherein the blanket gas comprises at least 99.995 mol % argon.

5. The method of claim 1, wherein the blanket gas comprises less than 10 ppm oxygen.

6. A system comprising:
    a. a tank in fluid communication with a fluid handling system for storing a volume of hydrate inhibitor comprising glycol; and
    b. a layer of blanket gas comprising argon in direct contact with the volume of hydrate inhibitor in the tank.

7. The system of claim 6, further comprising:
    a blanket gas inlet conduit connecting the layer of blanket gas with a source of the blanket gas;
    a blanket gas inlet valve in the blanket gas inlet conduit for controlling introduction of blanket gas into the tank as the volume of hydrate inhibitor in the tank decreases; and
    a blanket gas outlet conduit connecting the layer of blanket gas with a vent;
    a blanket gas outlet valve in the blanket gas outlet conduit for controlling exit of blanket gas from the tank as the volume of hydrate inhibitor in the tank increases.

8. The system of claim 7, further comprising a level detector located such that the level detector can monitor the level of hydrate inhibitor in the tank.

9. The system of claim 8, wherein the level detector utilizes at least one of radar, nucleonic, bubbler and float technologies.

10. The system of claim 7, further comprising a hydrate inhibitor conduit connecting the volume of hydrate inhibitor in the tank with a source of the hydrate inhibitor.

11. The system of claim 8, wherein the source of the blanket gas is one of a tank of argon and a local cryogenic distillation unit.

12. The system of claim 7, wherein the tank is located within a leg of an offshore platform associated with offshore oil and gas production.

\* \* \* \* \*